Figure 1:
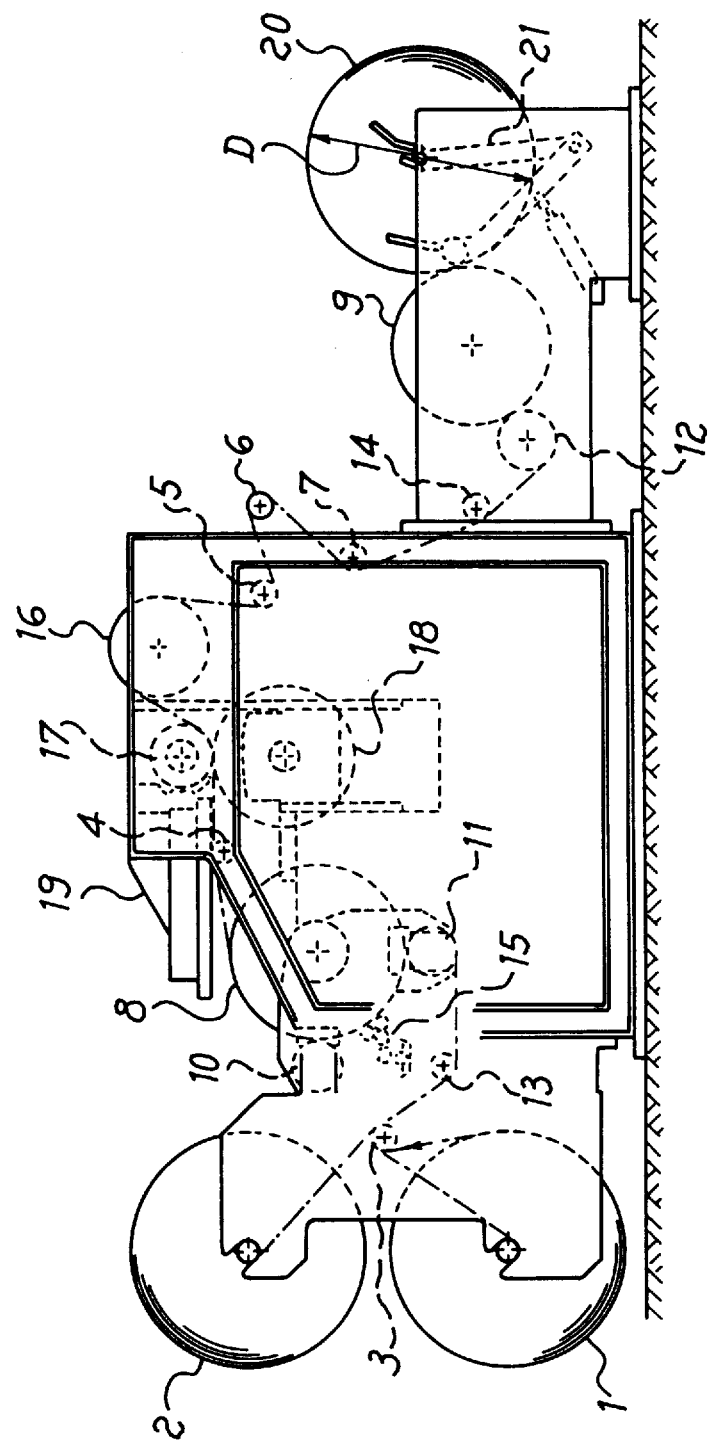

United States Patent [19]
Dell'Olmo

[11] Patent Number: 5,862,750
[45] Date of Patent: Jan. 26, 1999

[54] METHOD FOR IMPRESSING DIRECTLY ON PAPER HOLOGRAMS, KINETIC HOLOGRAMS, DIFFRACTION PATTERNS OR MICROENGRAVINGS PRODUCING OTHER OPTICAL EFFECTS

[75] Inventor: Giancarlo Dell'Olmo, Milan, Italy

[73] Assignee: Oranmay Investments B.V., Amsterdam, Netherlands

[21] Appl. No.: 849,816

[22] PCT Filed: Dec. 19, 1995

[86] PCT No.: PCT/IT95/00222

§ 371 Date: Jun. 16, 1997

§ 102(e) Date: Jun. 16, 1997

[87] PCT Pub. No.: WO96/19357

PCT Pub. Date: Jun. 27, 1996

[30] Foreign Application Priority Data

Dec. 20, 1994 [IT] Italy .................................. MI94A2583

[51] Int. Cl.⁶ ................................ B31F 1/07; B44C 1/24
[52] U.S. Cl. ................................ 101/32; 101/25; 101/27; 101/488
[58] Field of Search ................................ 101/22, 23, 25, 101/27, 32, 5, 6, 487, 488

[56] References Cited

U.S. PATENT DOCUMENTS

| | | | |
|---|---|---|---|
| 3,024,154 | 3/1962 | Singleton et al. | 101/23 |
| 3,399,101 | 8/1968 | Magid | 101/23 |
| 3,932,245 | 1/1976 | Erb et al. | 101/23 |
| 4,135,962 | 1/1979 | Sinclair et al. | 101/32 |
| 4,715,623 | 12/1987 | Roule et al. | 283/91 |
| 5,318,807 | 6/1994 | Gili Picoy | 101/3.1 |
| 5,555,801 | 9/1996 | Kroyer | 101/32 |
| 5,632,201 | 5/1997 | Roch | 101/487 |

FOREIGN PATENT DOCUMENTS 1 447 077   8/1976   United Kingdom .

OTHER PUBLICATIONS

Database WPI, Week 9442, Derwent Publications Ltd., GB AN 94–338829 & JP, A, 06 264 400 (Tokushi Seishi KK), 20 Sep. 1994.

*Primary Examiner*—Edgar Burr
*Assistant Examiner*—Leslie Grohusky
*Attorney, Agent, or Firm*—Seidel, Gonda, Lavorgna & Monaco, PC

[57] ABSTRACT

A method for impression microengravings, which reproduce holograms, kinetic holograms, or diffraction patterns, directly on paper through an embossing process. Paper is subjected to a humidification step to give it a degree of humidity between 60 and 80% of relative humidity. The humidified paper is then passed through an embossing group, consisting of an embossing cylinder carrying the microengravings and a counterthrust cylinder, at a temperature and a pressure on the paper within the ranges of 90–220° C. and 20–120 kg/mm², respectively.

10 Claims, 2 Drawing Sheets

METHOD FOR IMPRESSING DIRECTLY ON PAPER HOLOGRAMS, KINETIC HOLOGRAMS, DIFFRACTION PATTERNS OR MICROENGRAVINGS PRODUCING OTHER OPTICAL EFFECTS

The present invention relates to a method for impressing directly on paper holograms, kinetic holograms, diffraction patterns or microengravings producing other optical effects.

In order to permanently transfer optical microengravings (i.e. microengravings of the above-mentioned type) from a type plate to paper sheets it is usually necessary to provide a pretreatment of the paper consisting of a coating of the paper with a film of a material (such as PVC, polyester, polypropylene, polythene, coating, etc.) suitable to receive and permanently retain the microengravings present (in low relief and/or high relief) on the plate.

In fact, it is usually excluded that it is possible to transfer directly said microengravings onto common paper (i.e. not pre-treated as above) due both to the deformability (at micrometric level) of paper in time and to the surface micro-roughness usually found in paper sheets, caused by the fibrous structure of paper, which roughness is not compatible with the degree of resolution of the microengravings to be transferred, which can range from about 120 lines/mm to about 5000 lines/mm.

The present invention is aimed at overcoming said prejudice on the impossibility of impressing microengravings on common untreated paper by providing a method for impressing microengravings on common paper, which not only is simpler and cheaper than the conventional methods for impressing microengravings on a pre-treated paper substrate but also gives further advantages such as making available:

common paper which is personalized or decorated with the above-mentioned type of microengravings;

personalized or decorated paper as above which lends itself to be used as writing paper and printing paper (for offset, copperplate, typographic, serigraphic, rotogravure, xerographic, etc., printing);

personalized or decorated paper as above for documents which are to be protected from forgery or guaranteed for originality.

According to the method of the present invention for impressing directly on paper holograms, kinetic holograms, diffraction patterns or microengravings producing other optical effects, the impression of said microengravings is achieved by means of an embossing process wherein the paper is passed between a pair of embossing cylinders, namely an embossing cylinder, carrying said microengravings, and a counterthrust cylinder, said process being carried out, after humidification of the paper, at a temperature and a pressure on the paper passing between said cylinders respectively within the ranges of 90°–220° C. and 20–120 kg/mm$^2$, preferably 130°–170° C. and 40–100 kg/mm$^2$.

Figure 2:
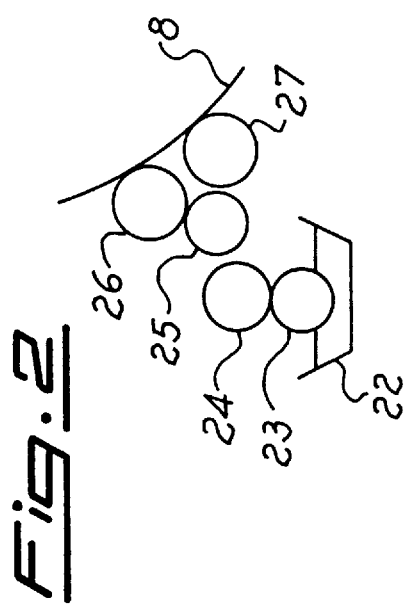
Figure 3:
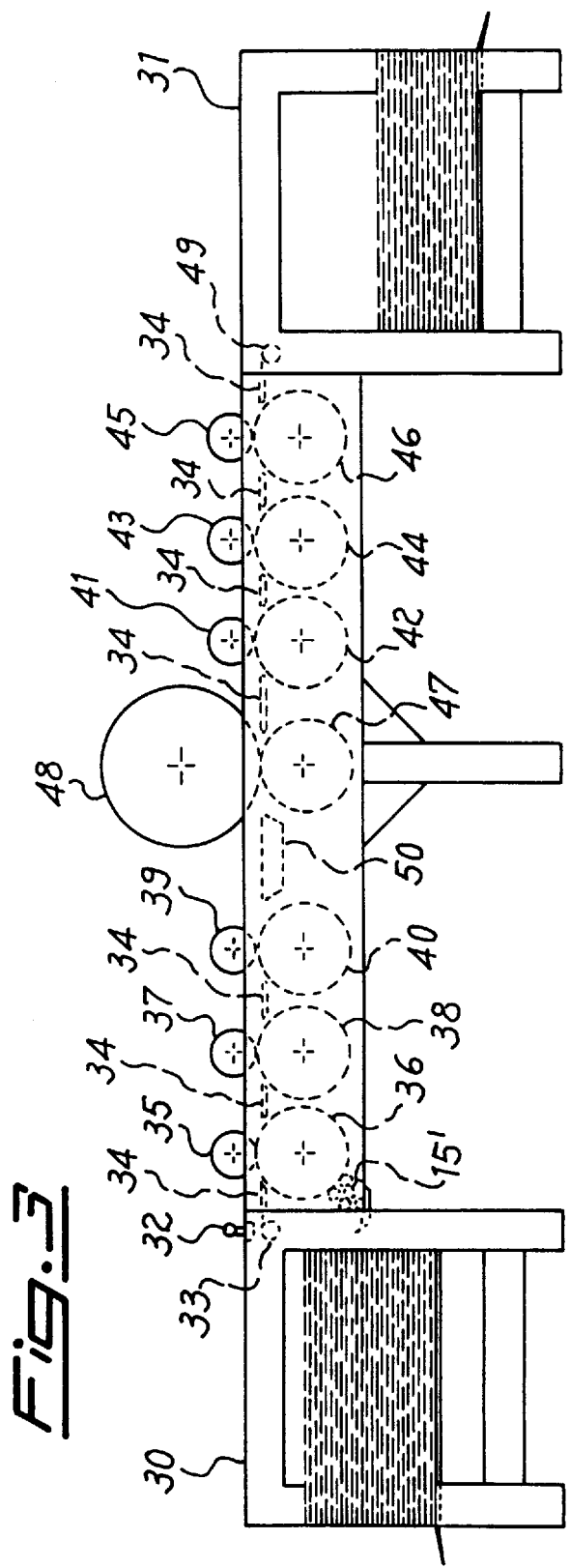

The characteristics of the invention will be apparent from the following description and from the annexed drawings which illustrate non-limiting examples of embodiments, whose figures show:

FIG. 1: a machine for embossing paper in reels according to the present method;

FIG. 2: an enlarged detail of FIG.1 relating to the paper humidifier;

FIG. 3: a machine for embossing paper in sheets according to the present method.

FIG. 1 shows an example of a machine for embossing paper in reels according to the present invention.

The structural and functional characteristics of the machine follow those of a conventional embossing machine with substantial differences regarding the conditions (temperature and pressure) under which the embossing process is carried out and regarding the presence of a paper humidifier upstream from the embossing group consisting of the embossing cylinder and the relevant counterthrust cylinder.

In FIG. 1, the meaning of the various members is the following:

1: reel of common paper for feeding the machine.

2: spare reel of common paper.

3, 4, 5, 6, 7: idle rollers.

8: roller, preferably coated with teflon or rubber, for driving and pre-heating the paper strip.

9: roller, also preferably coated with teflon or rubber, for driving and cooling the paper strip.

10, 11, 12: idle rollers elastically biased against rollers 8 and 9 respectively in order to assure the friction driving of the paper strip by rollers 8 and 9.

13, 14: idle rollers for tensioning the paper strip, which are capable of shifting their axis so as to keep the passing strip in conditions of proper tension.

15: humidifying group.

16: cooling roller.

17, 18: embossing group which consists of an embossing cylinder 17 carrying on its cylindrical surface the matrix of the microengravings to be impressed on the paper (the microengravings may be engraved directly on the embossing cylinder or on a thin type plate fixed onto the cylinder), and of an idle counterthrust cylinder 18 exerting on cylinder 17 an adequate pressure.

19: pre-heating unit, which is provided with infrared lamps or operated by gas and capable of shifting vertically for moving closer/farther with respect to the passing strip in order to adjust the pre-heating temperature of the strip.

20: strip winding reel.

21: arm which supports reel 20 and is capable of oscillating around its lower end, the angle of inclination thereof being a function of the diameter D of the winding reel (which diameter is smallest at the beginning of the process and largest at the end). The operation of the machine can be described as follows.

During the operation, the paper strip unwinds from reel 1 and passes first on rollers 3, 13, 11 and then on cylinder 8 where it undergoes a first pre-heating and a humidification by means of group 15, which gives paper a degree of humidity around 60–80% of relative humidity (in particular a degree of humidity equal to 70% according to a preferred embodiment). After coming out from roller 8, the paper strip passes under unit 19 where it undergoes a further pre-heating and then passes between the two cylinders of the embossing group where it receives the impression of the microengravings present on the embossing cylinder while undergoing a strong stretching action produced by both the high pressure exerted by cylinder 18 and the temperature of the two cylinders 17, 18. After coming out from the embossing group, the strip undergoes a first cooling by passing on cylinder 16 and then, after passing on rollers 5, 6, 7, 14 and 12, a last cooling on cylinder 9 to a temperature substantially equal to room temperature, after which it is wound on reel 20 abutting against said roller 9.

Cylinder 17 must have the characteristics usually required for embossing cylinders, namely it must be made from ground and lapped hardened steel of high surface resilience, with a very high degree of surface finish, such that the cylinder surface has a degree of linearity (i.e. of approximation of a straight line), along any generatrix of the cylindrical surface, close to the order of magnitude of the resolution of the microengravings on the plate. An acceptable value of said degree of linearity could be, for example, around 2000 lines per mm.

Cylinder 18, also made from ground and lapped hardened steel, is idle around its axis so that, when operating, it can be driven by the rotation of the upper cylinder 17. It exerts against cylinder 17 a pressure of a quite high value, to be selected in the range from 20 kg/mm$^2$ to 120 kg/mm$^2$ (said pressure is selected around 50 kg/mm$^2$ according to a preferred embodiment).

When operating, both cylinder 17 and 18 are heated at a temperature such as to assure that the paper of the document passing under the plate reaches a temperature between 90 and 220° C. (said temperature is selected around 150° C. according to a preferred embodiment).

Said temperature of cylinders 17, 18 (as well as that of cylinder 8 and unit 19) shall be selected according to the operating speed (strip moving speed), in that higher speeds require higher temperatures of the cylinders (and of unit 19) in order to achieve the same paper temperature.

For a paper temperature of about 150° C. and an operating speed around 60 m/min, the temperature of cylinders 17, 18 should be around 150° C.

The heating of cylinders 8, 17 and 18 may be obtained by means of a fluid circulating therein or through an electric resistor.

Also the cooling of cylinders 9 and 16 may be obtained by means of a fluid (e.g. water) circulating therein.

Fig. 2 shows an enlargement of group 15 of FIG. 1. This group has structural and functional characteristics like those of similar units used in other technological fields, for example in offset printing. It is made up of a water tank 22 wherein a continuously rotating roller 23 is partially immersed. Idle roller 24 has an oscillating axis such that it is taken from a position of temporary contact with roller 23 (e.g. for a portion of a revolution of 24) to a position of longer contact with roller 25 (e.g. for a complete revolution). The axis of roller 25, which is also idle, is in turn provided with a slight oscillating motion along a plane parallel to the plane passing through the axes of rollers 26 and 27 (which are also idle and permanently in contact with the passing strip), so that roller 25 is alternately in contact with said rollers 26 and 27 and can evenly distribute thereon the humidity received from 24.

The surface of the rollers of group 15 is preferably coated with a material easily soaked up with water, for example a velvet-like cotton fabric.

The correct humidity of the paper strip passing is adjusted by means of a humidity detector (not shown) positioned in contact with the strip coming out from group 15, which adjusts the duration of the temporary contact of roller 24 on roller 23 according to the detected humidity.

At the end of the process, the strip wound on reel 20 retains the impressed microengravings transferred from the embossing cylinder. The surprising possibility of permanent transfer of the microengravings on the paper strip can be explained by the fact that due to the humidification process and the subsequent heating under a high pressure, the paper undergoes a compacting and stretching process which results in a considerable reduction of its surface irregularity and deformability.

It may be desirable that the microengravings transferred on the paper (and consequently their optical effect) can not resist (or on the contrary can resist, according to needs) possible alterations or counterfeiting of the paper (humidification, erasing, etc.).

Whenever it is required that the impressed microengravings can resist possible humidifications, it will be necessary to use a refined paper charged with glue such as the paper employed in the manufacturing of kraft paper, of paper for nautical handbooks, etc. When it is desirable, on the contrary, to have microengravings of opposite characteristic, it will be necessary to use common paper (of hygroscopic nature).

As far as the possibility of resisting possible erasures is concerned, it should be considered that the printing matrix can be made with all engravings in low-relief or in high-relief or with engravings partly in low-relief and partly in high-relief possibly distributed in different areas (i.e. some portions of the plate have only high-relief engravings and other portions only low-relief engravings).

The above-mentioned possibility allows the manufacturing of microengraved paper which can (or can not) resist erasures. In fact, the microengravings impressed on paper in low-relief can resist erasures and the surface wear which paper undergoes in time, whereas those impressed in high-relief are erased at any counterfeiting attempt, this latter characteristic being very important whenever the paper is to be used for issuing documents whose originality is to be assured and protected from forgery (such as for example paper securities, bank cheques, etc.).

FIG. 3 shows an example of an embossing machine for paper in sheets according to the present method.

In this figure the meaning of the various members is the following:

30, 31: inlet and outlet sheet trays.

32: tube for picking and feeding the sheets, provided with suction mouths, which is part of a sheet-feeder device (not shown in the figure) quite similar to a suction sheet-feeder device for conventional offset printing.

33, 49: rotating rollers for feeding incoming and outgoing sheets respectively.

34: planes for sheet sliding.

35, 36: a pair of rollers for humidifying and feeding the paper, with 35 idle and driven into rotation by the underlying roller 36, and 36 which provides not only the sheet feeding but its humidification as well. To this purpose, 36 is coated with a fabric (e.g. cotton) which is soaked up with water by means of a humidification group 15' quite similar to, in structure and operation, group 15 of FIG. 1.

37/38, 39/140: pairs of rollers for pre-heating and feeding the paper, said rollers being preferably coated with a rubber or teflon layer and provided with a rotating motion.

41/42, 43/144, 45/146: pairs of rollers for cooling and feeding the paper, also preferably coated with a rubber or teflon layer.

47, 48: embossing group consisting of an embossing cylinder 47 carrying on its cylindrical surface the matrix of the microengravings to be impressed on the paper, and of an idle counterthrust cylinder 48 exerting on cylinder 47 an adequate pressure.

50: plane for sheets sliding and pre-eating, with heating obtained by means of infrared lamps or gas.

Likewise in the case of the machine of FIG. 1, the heating of cylinders 37–40 and 47, 48 may be achieved through a fluid circulating therein or by means of electric resistors. Also the cooling of cylinders 41–46 may be achieved through a circulating fluid.

The machine operation is quite similar to that of the machine of FIG.1, also with respect to the conditions of paper humidification and the temperature and pressure on the paper when it passes through the embossing group.

I claim:

1. At A method for impressing directly on paper microengravings which reproduce holograms, kinetic holograms, or diffraction patterns through an embossing process wherein the paper is passed through an embossing group consisting of an embossing cylinder carrying said microengravings and a counterthrust cylinder, comprising the steps of subjecting the paper to a humidification step giving it a degree of humidity between 60 and 80% of relative humidity, and then passing the humidified paper between said cylinders at a temperature and a pressure on the paper included within the ranges of 90°–220° C. and 20–120 kg/mm$^2$, respectively.

2. The method according to claim 1, wherein the temperature and pressure ranges are 130–170° C. and 40–100 kg/mm$^2$ respectively.

3. The method according to claim 1, wherein the temperature, pressure, and humidity of the paper passing through the embossing group are respectively approximately 150° C., 50 kg/mm$^2$, and 70% of relative humidity.

4. The method according to claim 1, wherein the paper coming out from the embossing group is cooled to a temperature substantially equal to room temperature.

5. The method according to claim 1, wherein the paper is preheated before passing through the embossing group and is heated to its final temperature by the cylinders of the embossing group.

6. The method according to claim 5, wherein the paper coming out from the embossing group is cooled to a temperature substantially equal to room temperature.

7. The method according to claim 6, further comprising the steps of supplying the paper on which the microengravings are impressed in the form of a strip unwound from a feed reel, passing the paper around a first cylinder where it undergoes the humidification step and a first heating step at the same time, next passes a heating unit where it undergoes a second heating step, and then passes through the embossing group, the strip coming out from the embossing group passing in sequence over a second and a third cylinder where the strip undergoes respective first and second cooling steps prior to being wound on a rewinding reel.

8. The method according to claim 7, wherein the humidification of the paper is obtained by passing the strip through a group of five rollers consisting of a first and a second idle roller abutting against a length of strip passing over said first cylinder, a third roller continuously rotating and partially immersed in water, a fourth idle roller contacting alternately the third roller and a fifth roller to transfer the humidity received from the third roller to the fifth roller, the fifth roller contacting alternately the first and second rollers to transfer the humidity received from the fourth roller, said rollers having their respective surfaces coated with velvet-like cotton fabric.

9. The method according to claim 6 wherein the paper on which the microengravings are impressed is in the form of separate sheets, passing each sheet between a first pair of cylinders where it undergoes the humidification step, then passing said sheet between at least a second pair of cylinders where it undergoes a first heating step, and next conveying the sheet past a heating unit where it undergoes a second heating step, then passing said sheet through the embossing group, the sheets coming out from the embossing group passing between a third pair of cylinders where the sheet undergoes a cooling step.

10. The method according to claim 9, wherein the humidification of the paper is obtained by passing the sheet through a group of five rollers consisting of a first and a second idle to roller abutting against a portion of the sheet passing over said first cylinder, a third roller continuously rotating and partially immersed in water, a fourth idle roller contacting alternately the third roller and a fifth roller to transfer the humidity received from the third roller to the fifth roller, the fifth roller contacting alternately the first and second rollers to transfer the humidity received from the fourth roller, said rollers having their respective surfaces coated with velvet-like cotton fabric.

* * * * *